(12) United States Patent
Chen

(10) Patent No.: US 7,081,978 B2
(45) Date of Patent: Jul. 25, 2006

(54) BEAM COMBINING DEVICE FOR MULTI-SPECTRAL LASER DIODES

(75) Inventor: Chungte W. Chen, Irvine, CA (US)

(73) Assignee: Raytheon Company, Waltham, MA (US)

( * ) Notice: Subject to any disclaimer, the term of this patent is extended or adjusted under 35 U.S.C. 154(b) by 261 days.

(21) Appl. No.: 10/390,389

(22) Filed: Mar. 17, 2003

(65) Prior Publication Data

US 2006/0098258 A1    May 11, 2006

(51) Int. Cl.
*G02B 5/32* (2006.01)
(52) U.S. Cl. .................. 359/15; 359/350; 359/618; 356/4.01
(58) Field of Classification Search ................ 359/15, 359/1, 16, 19, 350, 355, 356, 357, 558, 556, 359/569, 571, 618, 639, 641, 896; 356/3, 356/4.01, 9
See application file for complete search history.

(56) References Cited

U.S. PATENT DOCUMENTS

| | | | | |
|---|---|---|---|---|
| 5,260,828 A | * | 11/1993 | Londono et al. | 359/565 |
| 5,790,242 A | * | 8/1998 | Stern et al. | 356/4.04 |
| 6,449,066 B1 | * | 9/2002 | Arns et al. | 359/15 |
| 6,608,677 B1 | * | 8/2003 | Ray et al. | 356/301 |
| 6,633,367 B1 | * | 10/2003 | Gogolla | 356/5.15 |
| 6,738,130 B1 | * | 5/2004 | Chen | 356/4.01 |
| 6,775,065 B1 | * | 8/2004 | Hayashi et al. | 359/569 |
| 2002/0181035 A1 | * | 12/2002 | Donoghue | 359/10 |

* cited by examiner

*Primary Examiner*—Arnel C. Lavarias
(74) *Attorney, Agent, or Firm*—John E. Gunther; Leonard A. Alkov; Karl A. Vick

(57) ABSTRACT

A system and method for combining a predetermined number of laser beams. The system (30) includes a collimating lens (34) for receiving and collimating the laser beams and a holographic device (36) positioned to receive beams from the collimating lens (34) and output beams which are co-aligned. The holographic device (36) includes a predetermined number of holographic optical elements (46, 48, 50), wherein each holographic optical element (46, 48, 50) is designed for a particular wavelength of the laser beams. In the preferred embodiment, the holographic optical elements are volume holograms, and the system further includes a blazed grating (38) positioned between the collimating lens (34) and the holographic device (36) to account for variations in the wavelengths of the laser beams due to environmental conditions.

7 Claims, 4 Drawing Sheets

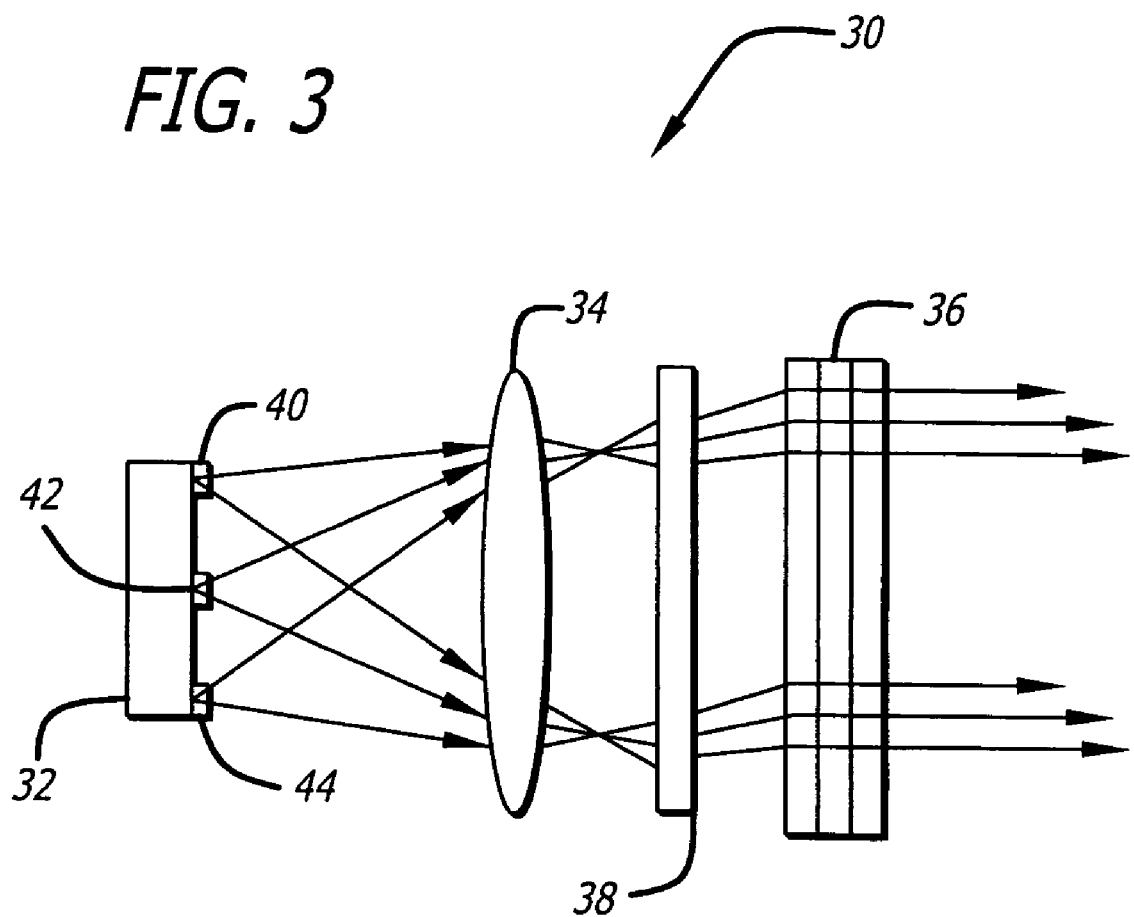

BEAM COMBINING DEVICE FOR MULTI-SPECTRAL LASER DIODES

BACKGROUND OF THE INVENTION

1. Field of the Invention

The present invention relates to optical systems. More specifically, the present invention relates to beam combining devices for multiple lasers.

2. Description of the Related Art

Current and future military applications will use lasers for several different functions. For example, a rifle being carried by a soldier may be equipped with systems for combat identification, laser range finding, infrared training exercises, pointing and targeting, and visible aiming and bore-sighting. Each function would require a laser operable at a different wavelength.

One proposal for the next generation laser range finder (LRF), for instance, includes three different color lasers for visible aiming, image intensifier aiming, and combat identification in addition to the ranging laser. These lasers must be co-aligned and combined before reaching the main telescope of the laser range finder.

Current methods for combining and co-aligning different color lasers are very labor intensive and expensive. Co-aligning the lasers requires a pair of wedges for each laser. An optician rotates each pair of wedges until all the laser beams are pointing in the same direction. Unfortunately, the mechanism for rotating the wedges is very complicated, and the alignment process is rather tedious and time consuming. Combining the lasers has typically been accomplished using several multi-layer dielectric-coating beam splitters. The multi-layer coating and beam splitter arrangement, however, are extremely expensive and complex.

Hence, a need exists in the art for a system or method for combining and co-aligning multiple lasers which is simpler and more cost effective than prior methods.

SUMMARY OF THE INVENTION

The need in the art is addressed by the system and method for combining a predetermined number of laser beams of the present invention. In most general implementation, the invention includes a collimating lens for receiving and collimating the laser beams and a holographic device positioned to receive beams from the collimating lens and output beams which are co-aligned.

In an illustrative implementation, the holographic device is comprised of a predetermined number of holographic optical elements, wherein each holographic optical element is designed for a particular wavelength of the laser beams. In the preferred embodiment, the holographic optical elements are volume holograms and the system further includes a blazed grating positioned between the collimating lens and the holographic device to account for variations in the wavelengths of the laser beams due to environmental conditions.

BRIEF DESCRIPTION OF THE DRAWINGS

FIG. 2a is an optical schematic of the novel beam combining device prior to volume holograms.

FIG. 2b is an optical schematic of the beam combining device of the present invention including volume holograms.

FIG. 3 is an optical schematic an athermalized holographic beam combiner designed in accordance with the teachings of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
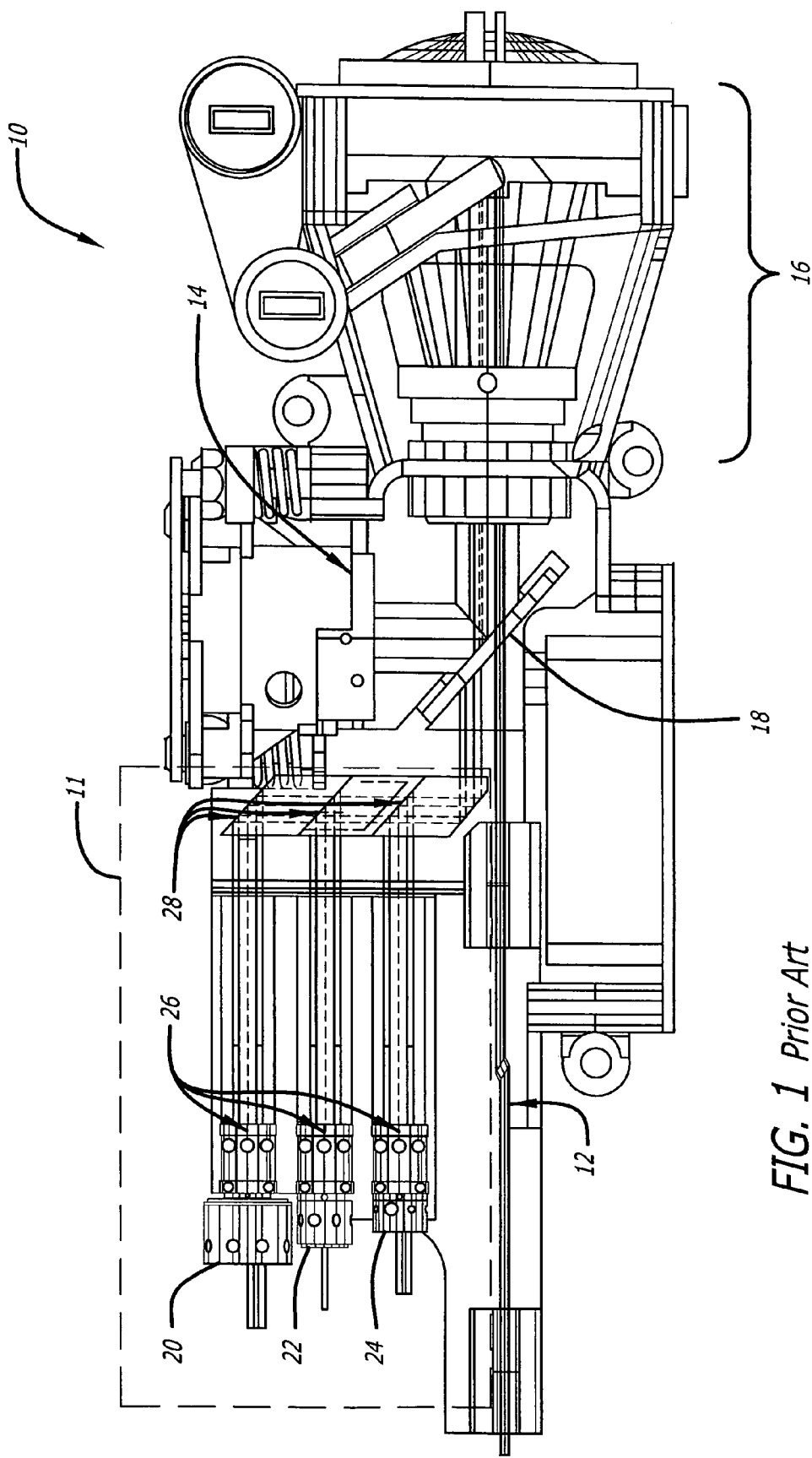
FIG. 1 is a diagram of a conventional laser range finder.

FIG. 1 is a diagram of a conventional laser range finder 10 comprised of an aiming light module 11, a laser transmitter 12, a receiver 14, and a telescope 16. A beam splitter 18 transmits the laser beams from the transmitter 12 and aiming light module 11 to the telescope 16, and reflects a return signal received by the telescope 16 to the receiver 14. The telescope 16 expands the transmitting beam to reduce the beam divergence of the out-going laser beam. The telescope 16 also increases the aperture to collect the return signal. The aiming light module 11 includes three different lasers (20, 22, 24): one operable at 0.65 µm (20) for visible light aiming, one at 0.85 µm (22) for imaging intensifier aiming, and one at 0.90 µm (24) for combat identification. The three lasers have to be co-aligned and combined before reaching the main telescope 16. A pair of wedges 26 in each laser channel is used to co-align the lasers such that the laser beams are traversing in the same direction. Several multi-layer dielectric coating beam splitters 28 are then used to combine the beams from these three lasers (20, 22, 24) and direct them to the beam splitter 18 and telescope 16.

As discussed above, the multi-layer dielectric-coating beam splitters are very expensive, and the conventional alignment process is complex, labor intensive, and also expensive.

The present invention overcomes these shortcomings by using volume holograms to co-align and combine beams from multiple lasers. The diffraction efficiency of a volume hologram is highly wavelength sensitive. This invention is based on this unique property associated with volume holograms to simplify the aiming light module of a laser range finder.

Figure 2A:
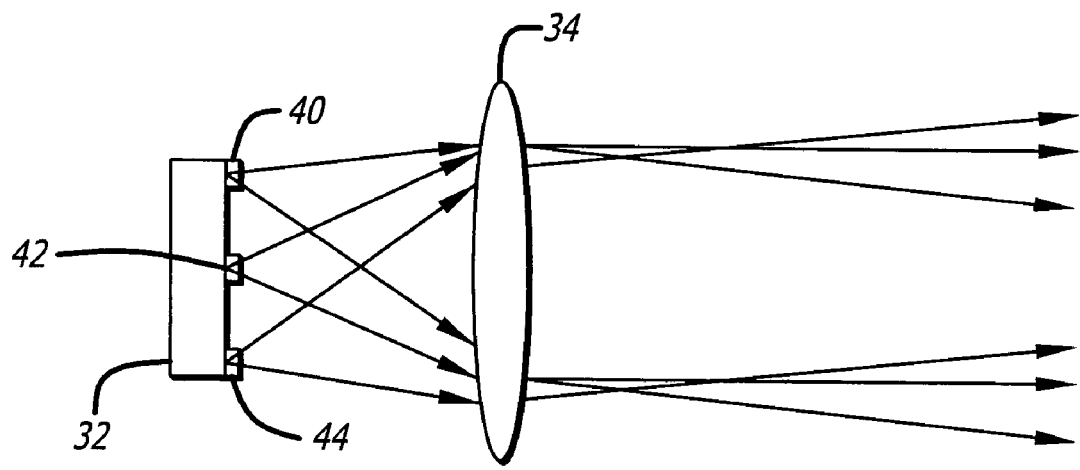
FIGS. 2a–b are an optical schematic of an illustrative embodiment of the beam combining device of the present invention.
Figure 2B:
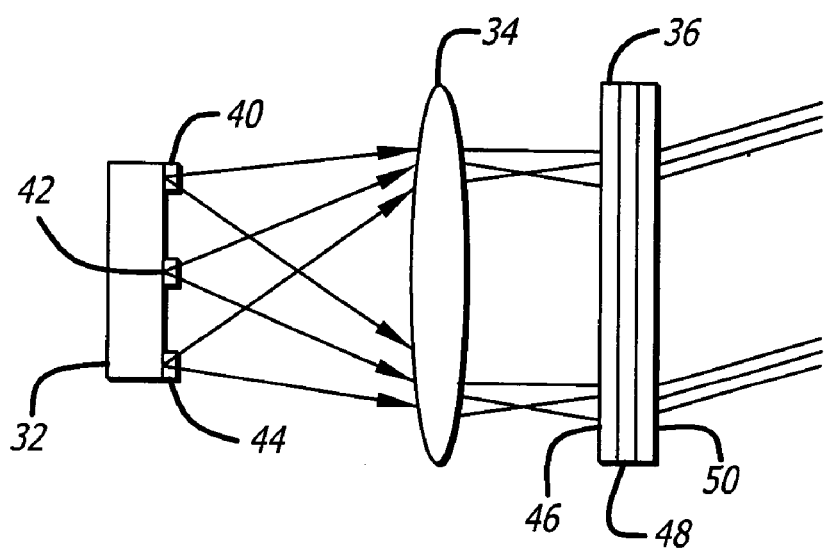

FIGS. 2a–2b illustrate the principles underlying the present invention. FIG. 2a is an optical schematic of the novel beam combining device prior to the volume holograms. FIG. 2b is an optical schematic of the beam combining device of the present invention including the volume holograms. Beams from three laser diodes (40, 42, 44) are passed through a collimating lens 34. In the preferred embodiment, the three laser diodes (40, 42, 44) are integrated on a single chip 32 in three physically separate locations. After collimation by the common collimator 34, the spatially separated lasers will emerge with slightly different beam angles as shown in FIG. 2a. The beams are then passed through a holographic device 36 comprised of three individual volume holograms (46, 48, 50).

In accordance with the teachings of the present invention, each laser (40, 42, 44) has a corresponding volume hologram (46, 48, 50) to bend the beam angle such that all three beams are co-aligned (i.e. having the same line-of-sight) as shown in FIG. 2b. To achieve a very high diffraction efficiency, a transmission volume holographic optical element requires carrier frequency. Therefore, the light-of-sight of the three lasers is bent away from the optical axis of the collimator 34. Since the diffraction efficiency of a volume hologram is very wavelength sensitive, the non-corresponding holograms act like plain parallel plates. Volume holograms are well known in the art. One of ordinary skill in the art should be able to design and fabricate volume holograms suitable for use in this invention without undue experimentation.

In the field, a laser range finder may be subject to different temperature conditions which affect the wavelength of the laser diodes. This would then change the beam angles output by the volume holograms, resulting in beams which are not aligned. This can be avoided by adding a blazed grating to the beam combining device.

FIG. 3 is an optical schematic of an athermalized holographic beam combiner 30 designed in accordance with the teachings of the present invention. A blazed grating 38 is added to the beam combiner of FIG. 2b, positioned between the collimator 34 and the holographic device 36.

Figure 4A:
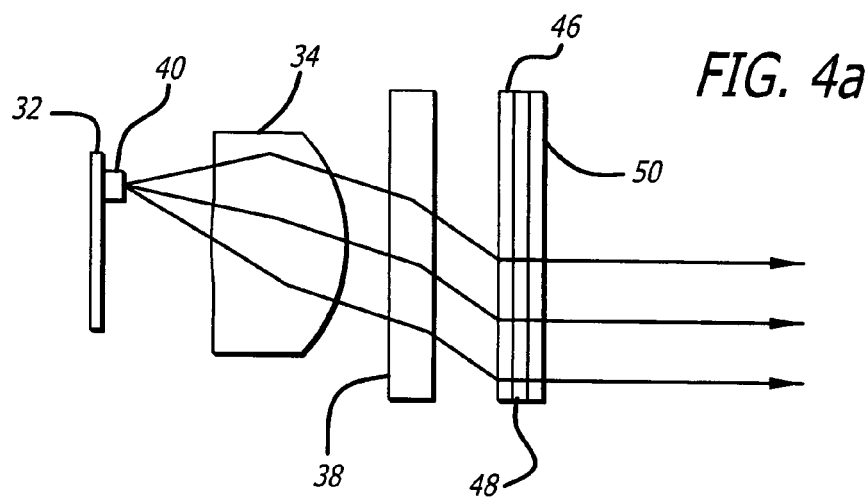
FIG. 4a is a ray tracing diagram of the first laser operating at a first wavelength (905 nm).
Figure 4B:
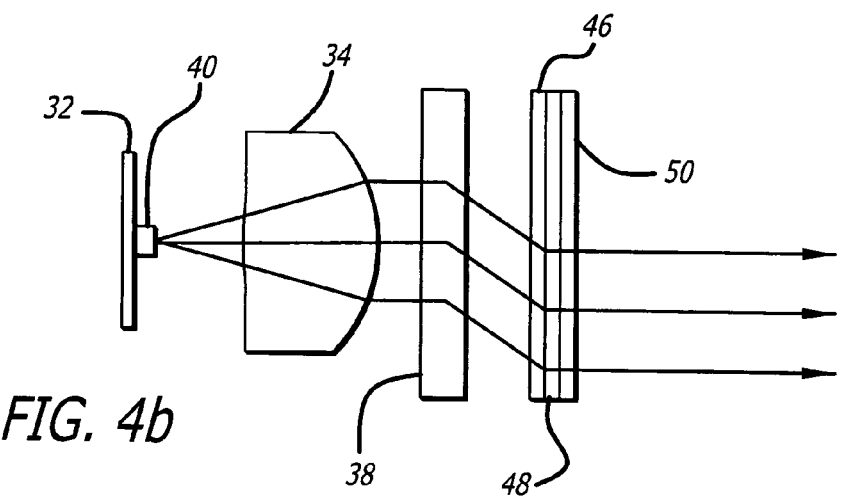
FIG. 4b is a ray tracing diagram of the second laser operating at a second wavelength (850 nm).
Figure 4C:
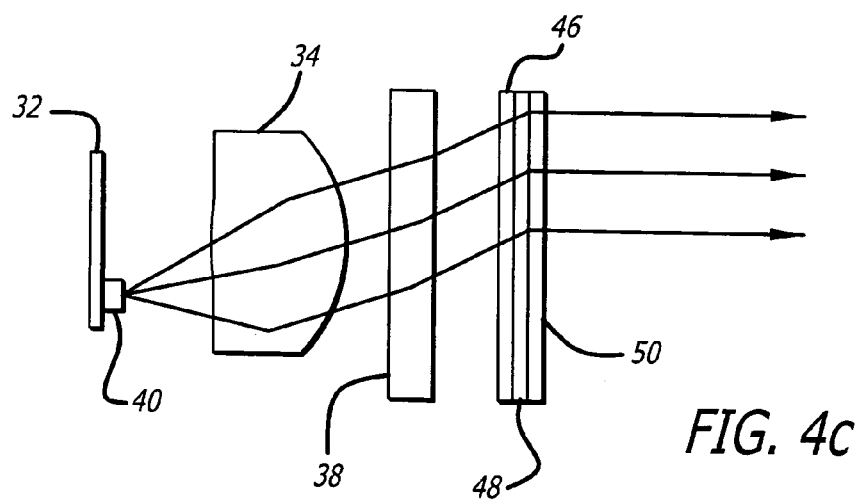
FIG. 4c is a ray tracing diagram of the third laser operating at a third wavelength (650 nm).

FIGS. 4a–4c show ray tracings of the athermalized holographic beam combiner of FIG. 3. The three diagrams represent the same device with three lasers on a single chip. Each individual wavelength is shown separately for illustrative purposes only. FIG. 4a is a ray tracing diagram of the first laser 40 operating at a first wavelength (905 nm). FIG. 4b is a ray tracing diagram of the second laser 42 operating at a second wavelength (850 nm). FIG. 4c is a ray tracing diagram of the third laser 44 operating at a third wavelength (650 nm).

The blazed grating 38 bends the light from the three lasers (40, 42, 44) by predetermined angles. The volume holograms (46, 48, 50) next to the blazed grating 38 then bends the light of each laser back to a common direction. It is important to have the blazed grating 38 designed and positioned such that any wavelength shifts due to temperature variations will not affect the output beam angle. Blazed gratings are well known in the art, and one of ordinary skill in the art will be able to design and fabricate blazed gratings suitable for this purpose.

The volume holograms can be replaced with one or more acoustic optical crystals. Since an acoustic optical crystal is an active holographic optical element, different lasers can time share the same acoustic optical crystal.

Using this invention, the aiming module of a laser range finder can be greatly simplified. Furthermore, the holographic beam combiner is extremely low cost due to the replicable nature associated with holograms. Once the master hologram is made, it is very easy to duplicate.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser range finder comprising:
    an aiming light module comprising:
        a predetermined number of laser sources;
        a collimating lens for receiving and collimating beams from said laser sources; and
        a holographic device positioned to receive beams from said collimating lens and output beams which are co-aligned, said holographic device including a predetermined number of holographic optical elements, wherein each holographic optical element is designed for a particular wavelength of said laser beams;
    a laser transmitter;
    a receiver;
    a telescope; and
    a beamsplitter positioned to direct laser beams from said transmitter and said aiming light module to said telescope, and a return signal received by said telescope to said receiver.

2. The invention of claim 1 wherein said laser sources are integrated on a single chip.

3. The invention of claim 1 wherein said holographic optical elements are volume holograms.

4. The invention of claim 1 wherein said system further includes athermalization means for accounting for variations in the wavelengths of said laser beams due to environmental conditions.

5. The invention of claim 4 wherein said athermalization means includes a blazed grating.

6. The invention of claim 5 wherein said blazed grating is positioned between said collimating lens and said holographic device.

7. The invention of claim 1 wherein said holographic device includes at least one acoustic optical crystal which is real time modulated to vary the grating spacings of said holographic device.

* * * * *